(12) United States Patent
Tanji et al.

(10) Patent No.: US 11,979,306 B2
(45) Date of Patent: May 7, 2024

(54) NETWORK SYSTEM, INFORMATION ACQUISITION DEVICE, INFORMATION ACQUISITION METHOD, AND PROGRAM

(71) Applicant: Nippon Telegraph and Telephone Corporation, Tokyo (JP)

(72) Inventors: Naoyuki Tanji, Tokyo (JP); Chihiro Maru, Tokyo (JP); Atsushi Takada, Tokyo (JP); Kyoko Yamagoe, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 651 days.

(21) Appl. No.: 17/262,922

(22) PCT Filed: Jul. 24, 2019

(86) PCT No.: PCT/JP2019/029100
§ 371 (c)(1),
(2) Date: Jan. 25, 2021

(87) PCT Pub. No.: WO2020/022402
PCT Pub. Date: Jan. 30, 2020

(65) Prior Publication Data
US 2021/0243103 A1 Aug. 5, 2021

(30) Foreign Application Priority Data

Jul. 27, 2018 (JP) ................. 2018-141394

(51) Int. Cl.
*H04L 43/00* (2022.01)
*G06F 8/60* (2018.01)
*H04L 43/04* (2022.01)

(52) U.S. Cl.
CPC ............... *H04L 43/14* (2013.01); *G06F 8/60* (2013.01); *H04L 43/04* (2013.01)

(58) Field of Classification Search
CPC ............ H04L 43/14; H04L 43/04; G06F 8/60
(Continued)

(56) References Cited

U.S. PATENT DOCUMENTS 9,152,602 B2 * 10/2015 Lippincott ............ G06F 15/173
9,712,375 B2 * 7/2017 Srinivasan .......... G06F 9/45533
(Continued)

FOREIGN PATENT DOCUMENTS

JP 2009-260846 11/2009
JP 2017-143452 8/2017
WO WO-2018138553 A1 * 8/2018

*Primary Examiner* — Melvin H Pollack
(74) *Attorney, Agent, or Firm* — Fish & Richardson P.C.

(57) ABSTRACT

Provided are a disposition rule saving unit that saves a disposition rule indicating at least a login method and disposition corresponding to the login method of an agent, a control rule saving unit that saves a control rule indicating at least an OS type and control information corresponding to the OS type of a target device of a network service, a data extraction unit that extracts configuration information including a login method and the OS type of the target device of the network service from a response result of construction processing, an agent disposition unit that determines disposition of an agent based on the login method of the extracted configuration information and the disposition rule, and an agent disposition unit that determines control processing of the agent based on the OS type of the extracted configuration information and the control rule.

6 Claims, 5 Drawing Sheets

(58) Field of Classification Search
USPC .................................................. 709/204, 224
See application file for complete search history.

(56) References Cited

U.S. PATENT DOCUMENTS

| | | | | |
|---|---|---|---|---|
| 9,906,400 | B2* | 2/2018 | Watariuchi | H04L 41/0866 |
| 9,983,860 | B1* | 5/2018 | Koty | H04L 67/10 |
| 10,084,672 | B2* | 9/2018 | Hoja | H04L 43/04 |
| 10,116,675 | B2* | 10/2018 | Brown | H04L 41/069 |
| 10,116,696 | B2* | 10/2018 | Porras | H04L 63/20 |
| 10,250,641 | B2* | 4/2019 | Porras | H04L 63/20 |
| 10,284,427 | B2* | 5/2019 | Maes | H04L 41/145 |
| 10,404,556 | B2* | 9/2019 | Reynolds | H04L 43/045 |
| 10,454,974 | B2* | 10/2019 | Reddem | H04L 63/205 |
| 10,505,785 | B2* | 12/2019 | Sasaki | H04L 41/12 |
| 10,558,719 | B2* | 2/2020 | Tuchman | G06F 16/3344 |
| 10,587,484 | B2* | 3/2020 | Nazar | H04L 43/04 |
| 10,643,002 | B1* | 5/2020 | Veselov | G06F 21/00 |
| 10,673,716 | B1* | 6/2020 | Sethuramalingam | G06F 16/9024 |
| 10,771,327 | B2* | 9/2020 | Bendre | G06F 21/577 |
| 10,873,794 | B2* | 12/2020 | Kulshreshtha | H04Q 9/02 |
| 10,997,191 | B2* | 5/2021 | Bingham | G06F 11/323 |
| 11,165,856 | B2* | 11/2021 | Baradaran | H04L 41/142 |
| 11,233,841 | B2* | 1/2022 | Wei | H04L 67/02 |
| 11,405,300 | B2* | 8/2022 | Kushmerick | H04L 43/16 |
| 11,567,994 | B2* | 1/2023 | Karam | G06F 16/9024 |
| 11,706,099 | B2* | 7/2023 | Chitalia | G06F 9/5072 709/224 |
| 2017/0161101 | A1* | 6/2017 | Khazanchi | H04L 67/01 |
| 2017/0288941 | A1* | 10/2017 | Mathew | H04L 41/0823 |
| 2018/0262991 | A1* | 9/2018 | Rao | H04W 52/0261 |
| 2018/0324064 | A1* | 11/2018 | Tola | H04L 67/1097 |
| 2019/0058709 | A1* | 2/2019 | Kempf | G06F 21/64 |
| 2019/0166031 | A1* | 5/2019 | Francis | H04L 41/046 |

* cited by examiner

← 151 CONFIGURATION INFORMATION

| No. | TARGET APPARATUS NAME | ID | IP ADDRESS | CONTROL/LOGIN METHOD | INTRODUCED SOFTWARE | OS | topology |
|---|---|---|---|---|---|---|---|
| 1 | app_server | 1usjs-sfgkj | 192.168.10.2 | ssh admin/admin | snmp-server | Windows | link_num=1 role=server |
| 2 | lb_server | afsgg-jasj3 | 192.168.11.3 | CERTIFICATE /root/ssh/login.pem | netflowd | Linux | link_num=3 role=lb |
| 3 | gateway | ijbmj-78hij | 192.168.12.10 | REST-API | — | Junos | link_num=2 role=gw |

Fig. 3

152 DISPOSITION RULE

| No. | if | then |
|---|---|---|
| 1 | LOGIN METHOD: ssh<br>INTRODUCED: snmp-server | service_start_snmpd.sh |
| 2 | LOGIN METHOD: CERTIFICATE<br>INTRODUCED: NONE | install_snmpd.sh<br>service_start_snmpd.sh |
| 3 | LOGIN METHOD: REST-API<br>INTRODUCED: snmp-server | curl_snmpd_start.sh |

Fig. 4

153 CONTROL RULE

| No. | if | then |
|---|---|---|
| 1 | OS = windows | config = window.conf |
| 2 | OS = Linux | config = linux.conf |
| 3 | OS = Junos | config = junos.conf<br>python set_mirror-port.py |
| 4 | topology.link_num = 1 &<br>topology.role = server | sh exe_tcp_dump.sh |

Fig. 5

NETWORK SYSTEM, INFORMATION ACQUISITION DEVICE, INFORMATION ACQUISITION METHOD, AND PROGRAM

CROSS-REFERENCE TO RELATED APPLICATIONS

This application is a National Stage application under 35 U.S.C. § 371 of International Application No. PCT/JP2019/029100, having an International Filing Date of Jul. 24, 2019, which claims priority to Japanese Application Serial No. 2018-141394, filed on Jul. 27, 2018. The disclosure of the prior application is considered part of the disclosure of this application, and is incorporated in its entirety into this application.

TECHNICAL FIELD

The present disclosure relates to a network system, an information acquisition apparatus, an information acquisition method, and a program.

BACKGROUND ART

Maintenance operations can roughly be classified into "measurement" for acquiring the amount of communication flowing through a network (NW) and machine loads, "analysis" that leads to abnormality detection, quality improvement, and the like, and "control" for replacing or restarting apparatuses and the like for recovery from failures. "Measurement" is for acquiring information to be used as a basis of analysis and control.

It is necessary to design an information acquisition method used in "measurement" on the basis of configuration information such as connection relationships of devices, a software configuration of each device, and the like. Designing of the information acquisition method in consideration of the configuration information requires many maintenance operations.

(1) A specific example of the "measurement" technology in a service using a company's infrastructure will be described.

In the case of a service using a company's infrastructure (an access network, a core network, or a cloud, for example), a specification and a control method of each apparatus are clear. It is thus possible to acquire information in "measurement" by disposing software or installing a setting for monitoring each environment in advance.

Patent Literature 1 describes a network operation monitoring system adapted such that an agent is introduced and a manager apparatus for collecting operation monitoring data from an agent apparatus is included in a company's infrastructure environment.

(2) A specific example of the "measurement" technology in a BtoBtoX service will be described.

In the case of the BtoBtoX service, a service provider can measure information (the amount of communication, a machine load, radio wave intensity, and the like) of an infrastructure (an access network infrastructure, a core network infrastructure, and a cloud infrastructure, for example) using means prepared by each infrastructure provider.

Patent Literature 2 describes a management apparatus that automatically coordinates information necessary to use an application programming interface (API) in a BtoBtoX environment. The apparatus described in Patent Literature 2 enables automatic setting for using an information acquisition application programming interface (API) of an infrastructure provider using key information (such as an ID of a virtual machine (VM)) determined at the time of service construction.

CITATION LIST

Patent Literature

Patent Literature 1: JP 2009-260846 A
Patent Literature 2: JP 2017-143452 A

SUMMARY OF THE INVENTION

Technical Problem

In the case of isolation of a service failure, information of the same type and granularity is required across a plurality of infrastructures. However, the types and granularities (time intervals, apparatus units, and the like) of information that can be acquired from measurement sections that individual infrastructure providers provide are not always uniform. There is also a problem that the type and granularity of information that can be acquired from each of infrastructure providers are different.

The present disclosure has been made in view of such a background, and an object of the present disclosure is to provide a network system, an information acquisition apparatus, an information acquisition method, and a program capable of acquiring measurement information with fewer maintenance operations.

Means for Solving the Problem

In order to solve the aforementioned problem, the disclosure according to a first aspect provides a network system including: an agent configured to collect information of an infrastructure of a network service constructed in a network and transmit the collected information to an information acquisition apparatus via the network; and the information acquisition apparatus configured to acquire the information from the agent, in which the information acquisition apparatus includes a disposition rule saving unit configured to save a disposition rule indicating at least a login method and disposition corresponding to the login method of the agent, a control rule saving unit configured to save a control rule indicating at least an OS type and information of control processing corresponding to the OS type of a target device of the network service, a data extraction unit configured to extract configuration information including a login method and the OS type of the target device of the network service from a response result of construction processing, an agent disposition unit configured to determine disposition of the agent based on the login method of the extracted configuration information and the disposition rule saved in the disposition rule saving unit, and an agent control unit configured to determine control processing of the agent based on the OS type of the extracted configuration information and the control rule saved in the control rule saving unit, and the agent is dynamically disposed in the network service in accordance with the determined disposition of the agent and the determined control processing of the agent.

The disclosure according to a third aspect provides an information acquisition apparatus configured to acquire information from an agent that has collected information of an infrastructure of a network service constructed in a network, the information acquisition apparatus including: a disposition rule saving unit configured to save a disposition rule indicating at least a login method and disposition corresponding to the login method of the agent; a control rule saving unit configured to save a control rule indicating at least an OS type and information of control processing corresponding to the OS type of a target device of the network service; a data extraction unit configured to extract configuration information including a login method and the OS type of the target device of the network service from a response result of construction processing; an agent disposition unit configured to determine disposition of the agent based on the login method of the extracted configuration information and the disposition rule saved in the disposition rule saving unit; an agent control unit configured to determine control processing of the agent based on the OS type of the extracted configuration information and the control rule saved in the control rule saving unit; and an external control unit configured to dynamically dispose the agent in the network service in accordance with the determined disposition of the agent and the determined control processing of the agent.

The disclosure according to a fourth aspect provides an information acquisition method for an information acquisition apparatus configured to acquire information from an agent that has collected information of an infrastructure of a network service constructed in a network, in which a disposition rule indicating at least a login method and disposition corresponding to the login method of the agent and a control rule indicating at least an OS type and information of control processing corresponding to the OS type of a target device of the network service are stored in a storage unit, and the information acquisition method includes: extracting configuration information including a login method and the OS type of the target device of the network service from a response result of construction processing; determining disposition of the agent based on the login method of the extracted configuration information and the saved disposition rule; determining control processing of the agent based on the OS type of the extracted configuration information and the saved control rule; and dynamically disposing the agent m the network service in accordance with the determined disposition of the agent and the determined control processing of the agent.

The disclosure according to a fifth aspect provides a program that causes a computer serving as an information acquisition apparatus that acquires information from an agent that has collected information of an infrastructure of a network service constructed in a network to perform: saving a disposition rule indicating at least a login method and disposition corresponding to the login method of the agent; saving a control rule indicating at least an OS type and information of control processing corresponding to the OS type of a target device of the network service; extracting configuration information including a login method and the OS type of the target device of the network service from a response result of construction processing; determining disposition of the agent based on the login method of the extracted configuration information and the disposition rule saved in the saving of the disposition rule; and determining control processing of the agent based on the OS type of the extracted configuration information and the control rule saved in the saving of the control rule.

In this manner, the agent is dynamically disposed in the network service, and even if there are differences in specifications and control methods of apparatuses that configure an infrastructure and in types and granularities (time intervals, apparatus units, and the like) of information, the agent absorbs such differences and collects measurement information. In other words, the agent is dynamically disposed at a device or the like provided in each infrastructure by the information acquisition apparatus, and the type and the granularity of information collected by the agent are set through control processing.

The information acquisition apparatus can acquire measurement information with information types and granularities made uniform from an agent that monitors each environment with fewer maintenance operations even in a case in which types and granularities of information that can be acquired are different for each infrastructure provider or even in a case in which information is collected over a plurality of infrastructures due to isolation of a service failure.

The disclosure according to a second aspect is the network system according to the first aspect in which the control rule saving unit further saves the control rule indicating a relationship of connection to other devices and control information corresponding to the relationship of connection, the data extraction unit extracts the configuration information including a relationship of connection of the target device of the network service from the response result of the construction processing, and the agent control unit determines the control processing of the agent corresponding to the relationship of connection of the target device of the extracted configuration information based on the control rule.

In this manner, it is possible to determine the control processing for the agent on the basis of the control rule corresponding to the relationship of connection of the target device in the network service.

Effects of the Invention

According to the present disclosure, it is possible to provide a network system, an information acquisition apparatus, an information acquisition method, and a program capable of acquiring measurement information with fewer maintenance operations.

BRIEF DESCRIPTION OF DRAWINGS

FIG. 3 is a diagram illustrating an example of configuration information saved in a data saving unit of the information acquisition apparatus in the network system according to the embodiment.

FIG. 4 is a diagram illustrating an example of a disposition rule saved in a disposition rule saving unit of the information acquisition apparatus in the network system according to the embodiment.

FIG. 5 is a diagram illustrating an example of a control rule saved in a control rule saving unit of the information acquisition apparatus in the network system according to the embodiment.

DESCRIPTION OF EMBODIMENTS

Hereinafter, a network system according to an embodiment for carrying out the present disclosure (hereinafter, referred to as an "present embodiment") will be described with reference to drawings.

Embodiment

Figure 1:
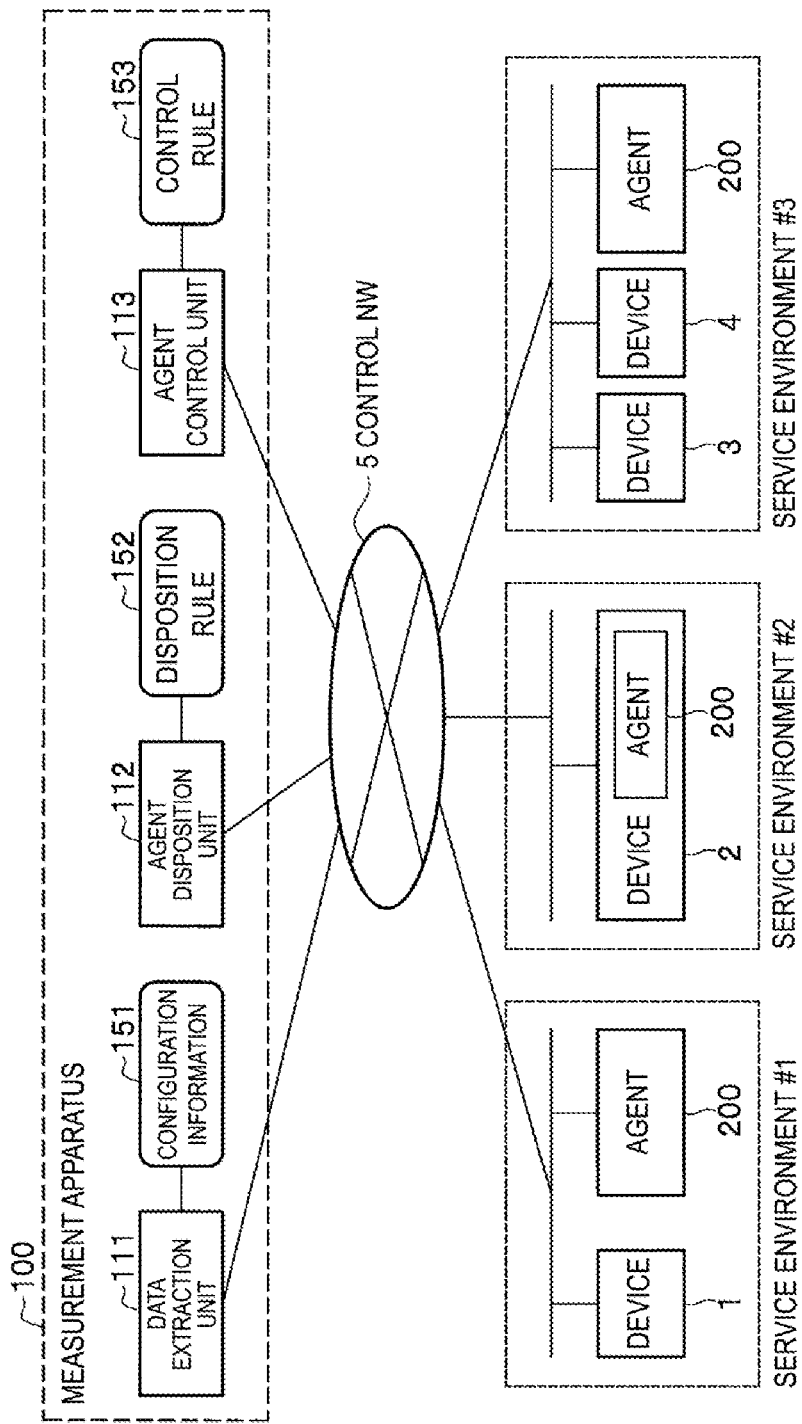
FIG. 1 is a diagram schematically illustrating a network system according to an embodiment of the present disclosure.

FIG. 1 is a diagram schematically illustrating the network system according to the embodiment of the present disclosure.

This is an example in which the network system according to the present embodiment is applied to an infrastructure configuring a BtoBtoX service, for example. The present disclosure can be applied to services other than the BtoBtoX service.

As illustrated in FIG. 1, the network system includes service environments #1 to #3 disposed in a control network (NW) 5 and a measurement apparatus 100 (information acquisition apparatus) that is connected to the control NW 5 (network) and acquires measurement information that is a basis of analysis and control of the service environments #1 to #3.

The service environments #1 to #3 are elements that configure a BtoBtoX service and are assumed to be provided by different infrastructure providers.

For example, the service environment #1 is an access network infrastructure. The service environment #2 is a core network infrastructure. The service environment #3 is a cloud network infrastructure. The network infrastructure, the core network infrastructure, and the cloud network infrastructure are provided by different infrastructure providers, and the types and granularities (time intervals, apparatus units, and the like) of information that can be acquired are different for each infrastructure provider.

The service environment #1 includes a device 1 that is a measurement target device of the access network infrastructure. The device 1 is, for example, a network device or a server apparatus. In the service environment #1 (access network infrastructure), an agent 200 is dynamically disposed that acquires measurement information such as a load of the device 1, the amount of communication (the amount of traffic) flowing through the NW, and a radio wave intensity and provides the measurement information to the measurement apparatus 100. Note that in the following description, dynamic disposition means that whether the agent 200 is disposed and where the agent 200 is disposed are determined in accordance with configuration information (configuration information 151 in FIG. 3, which will be described later).

The service environment #2 includes a device 2 that is a measurement target device of the core network infrastructure. The device 2 is, for example, an optical line terminal (OLT), a core router, a Layer 2 switch (L2SW), a Layer 3 switch (L3SW), or a network terminal equipment (NTE). In the service environment #2 (core network infrastructure), an agent 200 is disposed that acquires measurement information such as a load of the device 2 and the amount of communication (the amount of traffic) flowing through the NW and provides the measurement information to the measurement apparatus 100.

The service environment #3 includes devices 3 and 4 that are measurement target devices of the cloud network infrastructure. The devices 3 and 4 are, for example, server apparatuses. The server apparatuses include, for example, a data center (DC), a general-purpose server mounted on the DC, and a virtual server (virtual machine (VM)) achieved through virtualization of the general-purpose server. In the service environment #3 (cloud network infrastructure), an agent 200 is disposed that acquires measurement information such as loads of the devices 3 and 4 and the amount of communication (the amount of traffic) flowing through the NW and provides the measurement information to the measurement apparatus 100.

Agent 200

The agent 200 collects infrastructure information (the amount of communication, a machine load, and the like) of a network service constructed in the network and transmits the collected information to the measurement apparatus 100 via the control NW 5.

The agent 200 is software for implementing functions of the agent or an apparatus (agent apparatus) that has a configuration of a computer provided with such software.

The individual infrastructure providers are different, and thus the types and granularities (time intervals, apparatus units, and the like) of information that the agent 200 can acquire are different for each infrastructure provider.

The agent 200 is dynamically disposed in a network service in accordance with details of agent disposition processing and details of agent control processing. In addition, this dynamic disposition does not mean one in which the agent 200 is or is not introduced into an infrastructure of a network service, but means one in which the agent 200 is introduced in accordance with a configuration of a network service.

Note that the agent 200 may be provided in an apparatus that is different from the measurement target device or may be provided in the measurement target device. In a case in which functions of the agent 200 are provided in the measurement target device, the agent 200 and a monitoring target device are implemented as the same apparatus.

Measurement Apparatus 100

The measurement apparatus 100 is a server apparatus that acquires information from the agent 200. The measurement apparatus 100 includes a data extraction unit 111, an agent disposition unit 112, and an agent control unit 113.

The data extraction unit 111 extracts configuration information 151 including information regarding a login method and an OS type of a target device of a network service from a response result (which will be described later) of construction processing.

The data extraction unit 111 extracts the configuration information 151 including a relationship of connection of the target device of the network service from the response result of the construction processing.

The agent disposition unit 112 determines disposition of the agent 200 on the basis of the login method of the extracted configuration information 151 and a disposition rule 152 saved in a disposition rule saving unit 121 (which will be described later).

The agent control unit 113 determines control processing of the agent 200 on the basis of the OS type of the extracted configuration information 151 and a control rule 153 saved in a control rule saving unit 121 (which will be described later).

Figure 2:
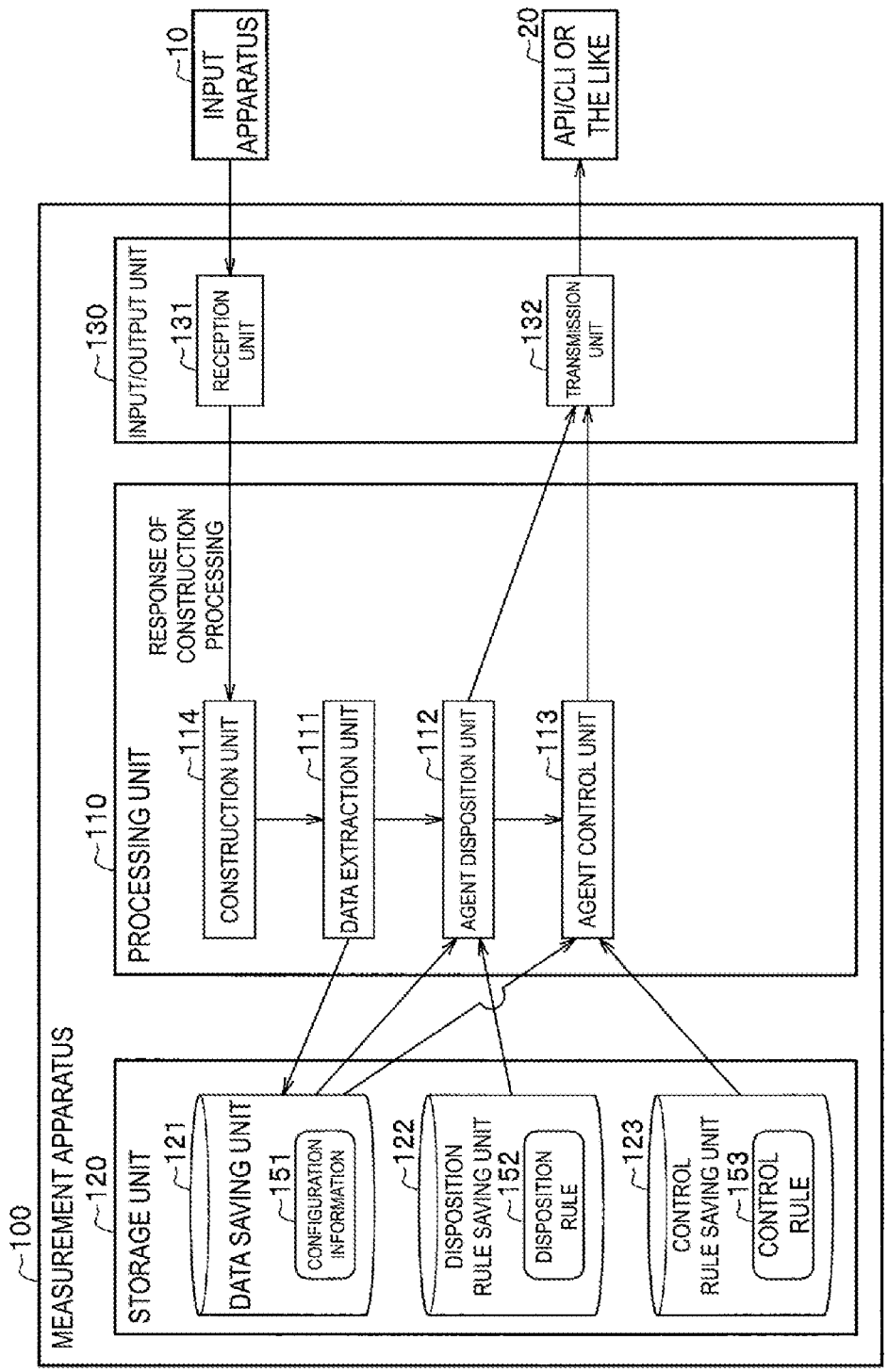
FIG. 2 is a block diagram illustrating an information acquisition apparatus in the network system according to the embodiment.

FIG. 2 is a block diagram illustrating the measurement apparatus 100 of the network system according to the embodiment of the present disclosure.

As illustrated in FIG. 2, the measurement apparatus 100 (information acquisition apparatus) includes a processing unit 110 including a CPU and the like, a storage unit 120 including a memory, an external storage device, and the like, and an input/output unit 130 including a wireless/wired interface, an IO device, a device manager, and the like.

The processing unit 110 includes a data extraction unit 111, an agent disposition unit 112, an agent control unit 113, and a construction unit 114.

The storage unit 120 includes a data saving unit 121, a disposition rule saving unit 122, and a control rule saving unit 123.

The data saving unit 121 saves the configuration information 151 (see FIG. 3) of the network service extracted by the data extraction unit 111.

The disposition rule saving unit 122 saves the disposition rule 152 (see FIG. 4) indicating at least a login method and disposition corresponding to the login method of the agent 200.

The control rule saving unit 123 saves the control rule 153 (see FIG. 5) indicating at least the OS type and information of control processing corresponding to the OS type of the target device of the network service.

The control rule saving unit 123 saves the control rule 153 indicating a relationship of connection to other devices and control information corresponding to the relationship of connection.

The input/output unit 130 includes a reception unit 131 and a transmission unit 132 (external control unit).

The reception unit 131 receives a response of construction processing from an input apparatus 10. The input apparatus 10 includes a keyboard, a pointing device, a keyboard, and the like. The input apparatus 10 receives a response of information processing from an infrastructure-as-a-service (IaaS service), for example.

The transmission unit 132 has a function as an external control unit that dynamically disposes the agent 200 in the network service in accordance with details of the agent disposition processing and details of the agent control processing.

The transmission unit 132 transmits external control information from the agent disposition unit 112 and the agent control unit 113. Specifically, the transmission unit 132 transmits the external control information (information for performing agent disposition and agent control) to an application programming interface (API)/command line interface (CLI) 20. The API/CLI 20 provides agent disposition and agent control on the basis of the external control information.

The transmission unit 132 transmits a construction request from the construction unit 114 to the IaaS service.

The construction unit 114 receives a response of construction processing from the network service and outputs the response to the data extraction unit 111. For example, the construction unit 114 issues a construction request for constructing a VM in an infrastructure-as-a-service (IaaS service) and receives a response of the construction processing from the IaaS service. The IaaS service is a service that provides an IT infrastructure such as hardware resources (CPU/memory/storage) on demand via the Internet using a virtualization technology.

The data extraction unit 111 extracts "data necessary for agent disposition" from the response result of the construction processing and saves the data as the configuration information 151 (see FIG. 3) in the data saving unit 121. The aforementioned "data necessary for agent disposition" includes, for example, an IP address and introduced software information. The data extraction unit 111 acquires the "data necessary for agent disposition" from a response result when the construction unit 114 constructs resources on the infrastructure.

The agent disposition unit 112 determines disposition of the agent 200 on the basis of the login method of the extracted configuration information 151 (see FIG. 3) and the disposition rule 152 (see FIG. 4) saved in the disposition rule saving unit 121.

The agent control unit 113 determines the control processing of the agent 200 on the basis of the OS type of the extracted configuration information 151 and the control rule 153 (see FIG. 5) saved in the control rule saving unit 121.

The agent control unit 113 determines the control processing of the agent 200 on the basis of the control rule 153 corresponding to the relationship of connection of the target device of the extracted configuration information 151.

Configuration Information 151

FIG. 3 is a diagram illustrating an example of the configuration information 151 saved in the data saving unit 121.

As illustrated in FIG. 3, the configuration information 151 has a target apparatus name, an ID, an IP address, a control/login method, introduced software, an OS, a topology (connection information and vacant port information) for each configuration information record No. (hereinafter, referred to as a configuration information No.).

The target apparatus name is "app #server" in the case of the configuration information No. 1, "lb #sever" in the case of No. 2, and "gateway" in the case of No. 3. Regarding "control/login method", control is "ssh"-and a login method is "admin/admin" in the case of the configuration information No. 1, control is "certificate"-and a login method is "/root/ssh/login.pem" in the case of No. 2, and control is "REST-API"-and a login method is "-" in the case of No. 3.

"Introduced software" is "snmp-server" in the case of the configuration information No. 1, "netflowd" in the case of No. 2, and "- (none)" in the case of No. 3. "OS" is "Windows" (server OS) in the case of the configuration information No. 1, "Linux" (server OS) in the case of No. 2, and "Junos" (OS of a network apparatus or a router) in the case of No. 3. "Topology" is "link #num=1 role=server" in the case of the configuration information No. 1, "link #num=3 role=lb" in the case of No. 2, and "link #num=2 role=gw" in the case of No. 3.

For example, in the case of the configuration information No. 1, it is possible to know with reference to the configuration information 151 that the target apparatus name is "app #server", that the ID is "1usjs-sfgkj", that the IP address is "192.168.10.2", that the control/login method is "ssh" and "admin/admin", that the introduced software is "snmp-server", that the OS is "Windows", and that the topology is "link #num=1 role=server".

As described above, whether the agent 200 is disposed and where the agent 200 is disposed are determined in accordance with the configuration information 151. In a case in which the "OS" is "Windows" like the configuration information No. 1, for example, software operating on "Windows" is introduced as the agent 200. In a case in which the "OS" is "Linux" like the configuration information No. 2, software operating on "Linux" is introduced as the agent 200. On the other hand, in a case in which the "OS" is "Junos" like the configuration information No. 3, a device disposed in the service environment is a server apparatus or a router. In the case of the agent 200 disposed in a router, in particular, it is difficult to simply introduce software as in the case of a server apparatus. In this case, transfer setting (setting of a mirror port or the like) is made in the router, and software is introduced as the agent 200 into a server apparatus that is a transfer destination. In this manner, the method of disposing the agent 200 is changed (dynamically disposed) in accordance with a condition of the service environment.

Disposition Rule 152

FIG. 4 is a diagram illustrating an example of the disposition rule 152 saved in the disposition rule saving unit 122.

As the disposition rule 152, a plurality of agent disposition methods are prepared, and a rule to be selected and executed is determined in accordance with the control/login method of the target apparatus.

As illustrated in FIG. 4, the disposition rule 152 associates the login method with the target thereof for each disposition rule record No. (hereinafter, referred to as a disposition rule No.).

In the case of the disposition rule No. 1 in which the login method is "ssh" and the introduced software is "snmp-server", "service #start #snmpd.sh" is designated. In the case of the disposition rule No. 2 in which the login method is "certificate"-and the introduced software is "none", "install #snmpd.sh/service #start #snmpd.sh" is designated.

In the case of the disposition rule No. 3 in which the login method is "REST-API"-and the introduced software is "snmp-server", "curl #snmpd #start.sh" is designated.

Control Rule 153 FIG. 5 is a diagram illustrating an example of the control rule 153 saved in the control rule saving unit 123.

The control rule 153 determines a configuration file to be used and necessary setting (a setting of a mirror port for the NW device and the like) (information on control processing) in accordance with the environment (the OS type, the relationship of connection to other devices, and the role) of the information acquisition target.

As illustrated in FIG. 5, the control rule 153 associates the OS with the control information thereof for each control rule record No. (hereinafter, referred to as a control rule No.).

In the case of the OS "Windows" in the control rule No. 1, "config=iindow.conf" is designated.

In the case of the OS "Linux" in the control rule No. 2, "config=linux.conf" is designated.

In the case of the OS "Junos" in the control rule No. 3, "config=junos.conflpython set #mirror-port.py" is designated.

In the case of "topology.link #num=1&topology.role=server" in the control rule No. 4, "sh-exe #tcp #dump.sh" is designated.

Through the config designation, it is possible set the type and the granularity (a time interval, an apparatus unit, and the like) of information that the agent 200 collects.

Hereinafter, a method of acquiring information of the network system configured as described above will be described.

First, dynamic disposition of the agent 200 will be described.

Figure 6:
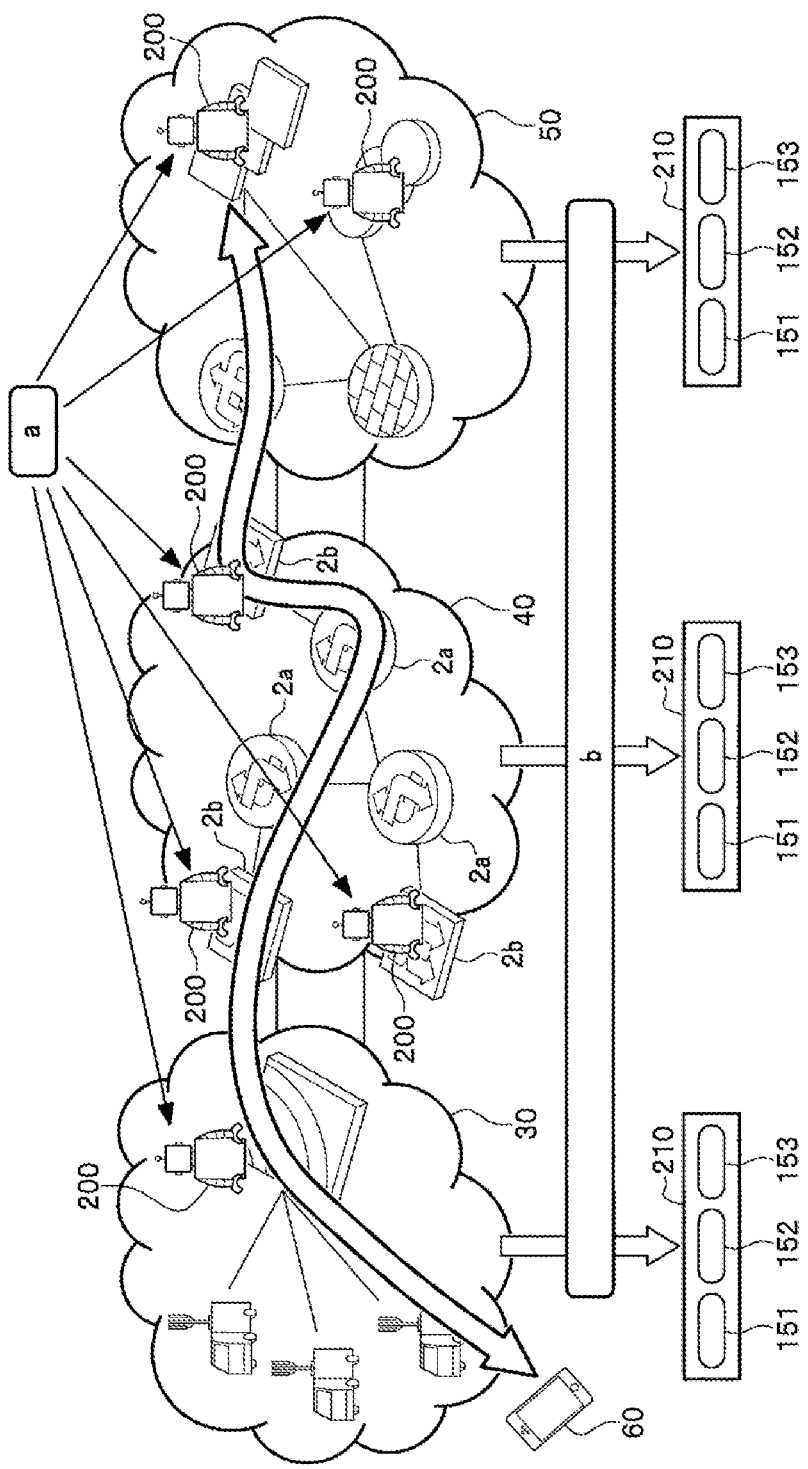
FIG. 6 is a conceptual diagram illustrating a measurement method based on dynamic disposition of agents in the network system according to the embodiment.

FIG. 6 is a conceptual diagram illustrating a measurement method through dynamic disposition of the agent 200. Note that the agent 200 is represented by illustration of a robot.

As illustrated in FIG. 6, an access network infrastructure 30 (service environment #1), a core network infrastructure 40 (service environment #2), and a cloud network infrastructure 50 (service environment #3) are constructed in the network (the control NW 5 in FIG. 1, for example). A user terminal 60 (a smartphone, for example) can be used across the plurality of infrastructures.

In the access network infrastructure 30 (service environment #1), for example, one agent 200 for acquiring information of the device 1 (see FIG. 1) is dynamically disposed (see the reference sign "a" in FIG. 6).

In the core network infrastructure 40 (service environment #2), for example, three agents 200 for acquiring information of the device 2 (see FIG. 1) are dynamically disposed (see the reference sign "a" in FIG. 6). More detailed description will be given below. The core network infrastructure 40 includes infrastructure internal devices 2a and infrastructure external devices 2b. In the core network infrastructure 40, the agents 200 may be placed only in the external devices 2b through which other infrastructures are connected.

In the cloud network infrastructure 50 (service environment #3), for example, two agents 200 for acquiring information of the devices 3 and 4 (see FIG. 1) are dynamically disposed (see the reference sign "a" in FIG. 6).

Each agent 200 transmits measurement information 210 of the device provided in each infrastructure to the measurement apparatus 100. The measurement information 210 that each agent 200 transmits is collected so as to be able to be analyzed using the configuration information 151 (see FIG. 3), the disposition rule 152 (see FIG. 4), and the control rule 153 (see FIG. 5) (see the reference sign b in FIG. 6).

In other words, each agent 200 is dynamically disposed in the device provided in each infrastructure by the measurement apparatus 100, and the type and the granularity (the time interval, the apparatus unit, and the like) of information that the agent 200 collects are set through control processing (for example, config designation).

The measurement apparatus 100 can acquire the measurement information 210 with the same type and granularity from the agents 200 dynamically disposed in the infrastructures.

Functions of Measurement Apparatus 100

Data Extraction Function

A function of extracting data necessary for agent disposition from a response result of construction processing will be described.

A case in which a VM is constructed on an IaaS service will be described as an example. The IaaS service is cloud computing of the cloud network infrastructure 50 (service environment #3) in FIG. 6, for example.

As illustrated in FIG. 2, the processing unit 110 of the measurement apparatus 100 includes the construction unit 114. The construction unit 114 issues a construction request for constructing a VM in the IaaS service for the transmission unit 132 of the input/output unit 130. The transmission unit 132 transmits the construction request to the IaaS service. The reception unit 131 of the input/output unit 130 receives a response of the construction processing from the IaaS service and outputs the response to the construction unit 114.

As illustrated in FIG. 2, the data extraction unit 111 of the processing unit 110 receives the response of the construction processing from the receiving unit 131. The data extraction unit 111 extracts data (an IP address, a management password, introduced software information, and the like) necessary for agent disposition from the received response result of the construction processing and saves the data as the configuration information 151 (see FIG. 3) in the data saving unit 121. As illustrated in FIG. 3, the configuration information 151 has, for each configuration information No., information regarding a target apparatus name, an ID, an IP address, a control/login method, introduced software, an OS, and a topology.

In the case of a BtoBtoX service, the data extraction unit 111 acquires the configuration information across a plurality of infrastructures from a catalog of construction functions or order information.

Agent Disposition Rule and Function Next, an agent disposition rule and function the agent will be described.

As illustrated in FIG. 2, the agent disposition unit 112 of the processing unit 110 determines details of the disposition processing on the basis of the data saved in the data saving unit 121 and the disposition rule 152 (see FIG. 4) saved in the disposition rule saving unit 122. Specifically, the agent disposition unit 112 determines a disposition location of software for acquiring information in accordance with the control/login method of the target apparatus indicated by the disposition rule 152 (see FIG. 4). For example, in the case of the disposition rule No. 1 of the disposition rule 152 illustrated in FIG. 5 in which the login method is "ssh" and the introduced software is "snmp-server", the agent disposition unit 112 selects and executes "service #start #snmpd.sh".

The agent disposition unit 112 causes the transmission unit 132 to transmit external control information (information for performing agent disposition) to the API/CLI 20 and performs agent disposition.

The API/CLI 20 provides agent disposition using the external control information.

Agent Control Rule and Function

Next, an agent control rule and function of the agent will be described.

As illustrated in FIG. 2, the agent control unit 113 of the processing unit 110 determines details of the control processing on the basis of the data saved in the data saving unit 121 and the control rule 153 (see FIG. 5) saved in the control rule saving unit 123. Specifically, the agent control unit 113 performs setting of a config file to be used and necessary setting (setting of a mirror port for the NW device and the like) in accordance with an environment of the information acquisition target (the OS type, the relationship of connection to other devices and the role) on the basis of the control rule 153.

For example, in the control rule No. 1 of the control rule 153 illustrated in FIG. 5, the OS "Windows" is designated, and the agent control unit 113 selects and executes "config=window.conf".

The agent control unit 113 causes the transmission unit 132 to transmit external control information (information for performing agent control) to the API/CLI 20 and performs agent control.

The API/CLI 20 provides agent control on the basis of the external control information.

Combination Examples of Rules

Combination examples of rules will be described with reference to FIGS. 2 to 5.

Example 1: Configuration information No. 1→disposition rule No. 1→control rule No. 1 As the agent disposition method for the device of the configuration information No. 1 (see FIG. 3), "service #start #snmpd.sh" is selected using the disposition rule No. 1 (see FIG. 4). As the control method for the disposed agent, "config=windows.conf" is selected using the control rule No. 1 (see FIG. 5).

Example 2: Configuration information No. 2→disposition rule No. 2→control rule No. 2 As the agent disposition method for the device of the configuration information No. 2 (see FIG. 3), "install #snmpd.sh, service #start #snmpd.sh" is selected using the disposition rule No. 2 (see FIG. 4).

As the control method for the disposed agent, "config=linux.coni" is selected using the control rule No. 2 (see FIG. 5).

In this manner, the agent 200 is dynamically disposed in accordance with the condition of the service environment.

As described above, the measurement apparatus 100 (see FIG. 1) according to the present embodiment includes the disposition rule saving unit 122, the control rule saving unit 123, the data extraction unit 111, the agent disposition unit 112, and the transmission unit 132.

The disposition rule saving unit 122 saves the disposition rule 152 indicating at least a login method and disposition corresponding to the login method of the agent. The control rule saving unit 123 saves the control rule 153 indicating at least the OS type and control information corresponding to the OS type of the target device of the network service. The data extraction unit 111 extracts the configuration information 151 including the login method and the OS type of the target device of the network service from the response result of the construction processing. The agent disposition unit 112 determines disposition of the agent 200 on the basis of the login method of the extracted configuration information 151 and the disposition rule 152. The transmission unit 132 dynamically disposes the agent 200 in the network service in accordance with details of the agent disposition and details of agent control processing.

Accordingly, the agent 200 is dynamically disposed in an infrastructure of a network service, and even if there are differences in specifications and control methods of apparatuses that construct the infrastructure and in types and granularity of information, the agent 200 absorbs such differences and collects measurement information. The measurement apparatus 100 can acquire measurement information the type and granularity of which are made uniform from an agent that monitors each environment with fewer maintenance operations even in a case in which the type and granularity of information that can be acquired are different for each infrastructure provider or even in a case in which information is collected across a plurality of infrastructures due to isolation of a service failure.

Among the processing described in the embodiment, all or some of the processing described as being performed automatically may be performed manually, or all or some of the processing described as being performed manually may be performed automatically using a known method. In addition, information including the processing procedures, the control procedures, the specific names, and the various types of data, and various parameters described in the aforementioned document and drawings can be modified as desired unless otherwise specified. Each constituent element of each apparatus illustrated is a functional concept and does not necessarily need to be physically configured as illustrated. That is, the specific modes of dispersion and integration of the devices are not limited to those illustrated and all or some of the devices can be configured such that they are functionally or physically dispersed or integrated in any units according to various loads, use conditions, or the like.

In addition, each of the configurations, functions, processing units, processing means, and the like described above may be partially or entirely implemented by hardware, for example, by designing an integrated circuit therefor. Each of the configurations, the functions, and the like may be implemented by software in which a processor interprets and executes a program that implements each function. Information such as a program, a table, and a file for implementing each function can be held in a recording device such as a memory, a hard disk, or a solid state drive (SSD) or a recording medium such as an integrated circuit (IC) card, a secure digital (SD) card, or an optical disc.

REFERENCE SIGNS LIST 1 to 4 Device
5 Control network (NW)

100 Measurement apparatus (information acquisition apparatus)
110 Processing unit
111 Data extraction unit
112 Agent disposition unit
113 Agent control unit
114 Construction unit
120 Storage unit
121 Data saving unit
122 Disposition rule saving unit
123 Control rule saving unit
151 Configuration information
152 Disposition rule
153 Control rule
200 Agent
1 to #3 Service environment

The invention claimed is:

1. A network system comprising:
an agent configured to collect information of an infrastructure of a network service constructed in a network and transmit the collected information to an information acquisition apparatus via the network; and
the information acquisition apparatus configured to acquire the information from the agent,
wherein the information acquisition apparatus includes one or more processors configured to:
save a disposition rule indicating at least a login method and disposition corresponding to the login method of the agent,
save a control rule indicating at least an operating system (OS) type and information of control processing corresponding to the OS type of a target device of the network service,
extract configuration information including a login method and the OS type of the target device of the network service from a response result of construction processing,
determine disposition of the agent based on the login method of the extracted configuration information and the disposition rule saved in the disposition rule saving unit, wherein the determined disposition of the agent comprises a commands file to be installed on the agent,
determine control processing of the agent based on the OS type of the extracted configuration information and the control rule saved in the control rule saving unit, wherein the determined control processing specifies a type and a granularity of information to be collected by the agent, and
dynamically dispose the agent in the network service including (i) install, on the agent, the commands file included in the determined disposition of the agent and (ii) instruct the agent to collect information in accordance with the type and the granularity of information included in the determined control processing of the agent.

2. The network system according to claim 1, wherein the one or more processors are further configured to:
save the control rule indicating a relationship of connection to other devices and control information corresponding to the relationship of connection,
extract the configuration information including a relationship of connection of the target device of the network service from the response result of the construction processing, and
determine the control processing of the agent corresponding to the relationship of connection of the target device of the extracted configuration information based on the control rule.

3. An information acquisition method for an information acquisition apparatus configured to acquire information from an agent that has collected information of an infrastructure of a network service constructed in a network, wherein
a disposition rule indicating at least a login method and disposition corresponding to the login method of the agent and a control rule indicating at least an OS type and information of control processing corresponding to the OS type of a target device of the network service are saved in a storage unit, and
the information acquisition method comprises:
extracting configuration information including a login method and the OS type of the target device of the network service from a response result of construction processing;
determining disposition of the agent based on the login method of the extracted configuration information and the saved disposition rule, wherein the determined disposition of the agent comprises a commands file to be installed on the agent;
determining control processing of the agent based on the OS type of the extracted configuration information and the saved control rule, wherein the determined control processing specifies a type and a granularity of information to be collected by the agent; and
dynamically disposing the agent in the network service including (i) installing, on the agent, the commands file included in the determined disposition of the agent and (ii) instructing the agent to collect information in accordance with the type and the granularity of information included in the determined control processing of the agent.

4. A non-transitory computer readable medium storing one or more instructions that causes a computer serving as an information acquisition apparatus that acquires information from an agent that has collected information of an infrastructure of a network service constructed in a network to perform:
saving a disposition rule indicating at least a login method and disposition corresponding to the login method of the agent;
saving a control rule indicating at least an OS type and information of control processing corresponding to the OS type of a target device of the network service;
extracting configuration information including a login method and the OS type of the target device of the network service from a response result of construction processing;
determining disposition of the agent based on the login method of the extracted configuration information and the disposition rule saved in the saving of the disposition rule, wherein the determined disposition of the agent comprises a commands file to be installed on the agent;
determining control processing of the agent based on the OS type of the extracted configuration information and the control rule saved in the saving of the control rule, wherein the determined control processing specifies a type and a granularity of information to be collected by the agent; and dynamically disposing the agent in the network service including (i) installing, on the agent, the commands file included in the determined disposition of the agent and (ii) instructing the agent to collect information in accordance with the type and the granularity of information included in the determined control processing of the agent.

5. The information acquisition method according to claim 3, the control rule indicating a relationship of connection to other devices and control information corresponding to the relationship of connection is saved in the storage unit, and the information acquisition method further comprises:

extracting the configuration information including a relationship of connection of the target device of the network service from the response result of the construction processing; and determining the control processing of the agent corresponding to the relationship of connection of the target device of the extracted configuration information based on the control rule.

6. The non-transitory computer readable medium according to claim 4, wherein the one or more instructions further causes the computer to perform:

saving the control rule indicating a relationship of connection to other devices and control information corresponding to the relationship of connection;

extracting the configuration information including a relationship of connection of the target device of the network service from the response result of the construction processing; and determining the control processing of the agent corresponding to the relationship of connection of the target device of the extracted configuration information based on the control rule.

* * * * *